Patented Sept. 10, 1946

2,407,479

UNITED STATES PATENT OFFICE 2,407,479

INTERPOLYMERIZATION PRODUCTS

Gaetano F. D'Alelio, Pittsfield, Mass., assignor to General Electric Company, a corporation of New York No Drawing. Application October 31, 1939, Serial No. 302,167

14 Claims. (Cl. 260—42)

This invention relates to the production of new materials having valuable and characteristic properties that make them especially suitable for use in industry, for example in molding, laminating, casting, coating and adhesive applications, and for other purposes. The invention is concerned more particularly with compositions of matter comprising an interpolymer (copolymer) or interpolymers of at least one polymerizable esterification product of at least one polyhydric alcohol, at least one alpha unsaturated alpha beta polycarboxylic acid and at least one esterifiable monohydroxy organic compound with at least one other polymerizable compound containing the grouping —CH=C<, e. g., ethylene compounds such as vinyl esters, acrylic esters, alkacrylic esters, itaconic esters, allyl esters, etc. For purpose of brevity, the above-described esterification product is hereafter designated generally as a "modified unsaturated alkyd resin." Specifically the invention relates to the production of synthetic, polymerized materials consisting of the product of polymerization of a mixture of copolymerizable materials consisting of (1) a polymerizable monohydric alcohol polyester of an alpha unsaturated alpha beta polycarboxylic acid and (2) a polymerizable esterification product selected from the class consisting of polymerizable esterification products of a polyhydric alcohol, an alpha unsaturated alpha beta polycarboxylic acid and a monocarboxylic acid, polymerizable esterification products of a monohydric alcohol, a polyhydric alcohol and an alpha unsaturated alpha beta polycarboxylic acid, and polymerizable esterification products of a monohydric alcohol, a polyhydric alcohol, an alpha unsaturated alpha beta polycarboxylic acid and a monocarboxylic acid.

The unmodified unsaturated alkyd resins, that is, unmodified esterification products of a polyhydric alcohol with an alpha unsaturated alpha beta polycarboxylic acid, do not lend themselves readily to the production of copolymers with other polymerizable materials. Because of their extended linear structure and advanced resinous nature, it is quite difficult to obtain homogeneous mixtures or solutions of such alkyd resins with many polymerizable monomeric materials. It is especially difficult and costly to obtain copolymers of uniform characteristics when the ratio of unsaturated alkyd resin to the polymerizable monomer is high, say 90 or 95 parts of unsaturated alkyd resin to 5 or 10 parts of the polymerizable monomer. Also, it is not feasible to prepare an unsaturated alkyd resin of low molecular weight merely by allowing the esterification to proceed to a limited degree. One reason for this is because the unreacted alcohol and acid groups then unreasonably limit the solubility of the partial ester in polymerizable monomers. Another reason is that the presence of such unreacted groups makes the final copolymerization product of such low resistance to the action of water, weak alkalies, etc., that it is unsuited for the usual commercial applications.

I have discovered that these difficulties can be obviated by producing the copolymer from an unsaturated alkyd resin which has been internally modified by an esterifiable monohydroxy organic compound, specifically a monohydric alcohol or a monobasic acid. These mono-esterifiable compounds interesterify with the polyhydric alcohol and the polycarboxylic acid, serving to interrupt and shorten the chain of the ultimate esterification product. These modified unsaturated alkyd resins are more fluid and more soluble in, and compatible with, polymerizable monomers than the unmodified unsaturated alkyd resins. It was surprisingly found that despite the shortening of the ester chain by modifying the unsaturated alkyd resin with a mono-esterifiable compound, the thus modified unsaturated alkyd resin had substantially the same copolymerizing capacity with polymerizable compounds containing a —CH=C< grouping as the unmodified unsaturated alkyd resins. This was quite unexpected and could not have been predicted from the known properties of unsaturated alkyd resins.

In carrying the present invention into effect a polymerizable esterification product of a polyhydric alcohol, an alpha unsaturated alpha beta polycarboxylic acid and a mono-esterifiable organic compound is prepared in accordance with technique now well known to those skilled in the alkyd resin art. Any polyhydric alcohol containing at least two esterifiable aliphatic hydroxyl groups, or mixtures of such alcohols, may be used in preparing the modified unsaturated alkyd resin. Examples of such polyhydric alcohols are ethylene glycol, di-, tri- and tetra-ethylene glycols, propylene glycol, trimethylene glycol, thiodiglycol, glycerine, pentaerythritol, etc. Any alpha unsaturated alpha beta polycarboxylic acid, or mixtures of such acids, may be reacted with the polyhydric alcohol or alcohols to form the polymerizable resin. Examples of such polycarboxylic acids are maleic, monohalomaleic, fumaric, monohalofumaric, citraconic, mesaconic, acetylene dicarboxylic, itaconic acid and its homologues as, for instance, alpha methyl itaconic acid, alpha ethyl itaconic acid, alpha alpha dimethyl itaconic acid, etc. Part of these unsaturated polycarboxylic acids, that is, up to about 75 mol per cent, may be replaced by non-ethylenic polycarboxylic acids, e. g., the saturated aliphatic polycarboxylic acids such as succinic, adipic, glutaric, pimelic, sebacic, azelaic, suberic, tricarballylic, tartaric, citric, etc., cyclic polycarboxylic acids, more specifically the saturated cycloaliphatic polycarboxylic acids such as the cyclopropane dicarboxylic acids, the cyclohexane dicarboxylic acids, the alkyl cycloalkane polycarboxylic acids, etc., and the aromatic polycarboxylic acids, e. g., phthalic, benzoyl phthalic, terephthalic, benzophenone - 2,4' dicarboxylic acids, etc. Anhydrides of the polycarboxylic acids, if available, also may be used. The term "polycarboxylic acid" as used generally herein and in the appended claims therefore is intended to include within its meaning the anhydrides of the acids.

Various mono-esterifiable compounds may be incorporated into the unsaturated alkyd resin in order to modify the same. Thus, in producing the copolymers of this invention I may use an unsaturated alkyd resin which has been modified by incorporating therein a saturated or unsaturated, normal or isomeric monohydric alcohol, or mixtures thereof, a saturated or unsaturated monocarboxylic acid, or mixtures thereof, or both such esterifiable monohydroxy organic compounds. Examples of monohydric alcohols which may be used as modifiers of the alkyd resin are propyl, isopropyl, butyl, isobutyl, amyl, isoamyl, hexyl, octyl, decyl, dodecyl to octadecyl, inclusive, allyl, methallyl, 1-chlorallyl, 2-chlorallyl, crotyl, cinnamyl alcohols, 3-hydroxy butene-1, etc. The use of methyl and ethyl alcohols is not precluded, but in general these alcohols are less suitable because of their lower boiling points. As monobasic acids may be used, for example, the unsubstituted saturated or unsaturated, normal or isomeric acids containing only one esterifiable group such as acetic, propionic, butyric to stearic, inclusive, benzoic, acrylic, methacrylic, cinnamic, etc., acids of drying, semi-drying and non-drying oils, e. g., the acids of tung oil, linseed oil, rape seed oil, soya bean oil, castor oil, etc. The mono-esterifiable compound may be introduced into the esterification product before, during or after the esterification of the polyhydric alcohol with the polycarboxylic acid under conditions that interesterification of the mono-esterifiable compound with the incompletely esterified polyhydric alcohol-polycarboxylic acid reaction product is obtained. That is, the mono-esterifiable compound must be introduced into the reaction mass before all of the acid groups of the polybasic acid or all of the alcohol groups of the polyhydric alcohol have been esterified.

In carrying the present invention into effect organic compounds containing the polymerizable grouping —CH=C<, or mixtures thereof, are interpolymerized with one or more modified unsaturated alkyd resins, such as above described, to produce new and valuable compositions. Illustrative examples of compounds containing such a grouping are esters containing ethylenic or acetylenic unsaturation in either the alcohol radical or the acid radical, or in both, e. g., saturated and unsaturated alcohol esters of unsaturated monocarboxylic and polycarboxylic acids, unsaturated alcohol esters of non-ethylenic (e. g., aromatic and saturated aliphatic) polycarboxylic acids, unsaturated alcohol esters of saturated monocarboxylic acids, etc.

More specific examples of compounds containing a —CH=C< grouping are the unsaturated alcohol esters, e. g., the allyl, methallyl, crotyl, propargyl, 1-chlorallyl, 2-chlorallyl, cinnamyl, 3-methyl allyl, vinyl, methvinyl, 2-phenyl allyl, 1-phenyl-2-propyn-1-yl, 3-methyl-4-nonyn-3-yl, 4-methyl-5-decyn-4-yl, 4-methyl-5-undecyn-4-yl, etc. esters of saturated and unsaturated, aliphatic and aromatic, monobasic and polybasic acids such, for instance, as acetic, propionic, butyric, valeric, caproic, acrylic, alkacrylic (e. g., methacrylic, ethacrylic, etc.), crotonic, oxalic, malonic, succinic, glutaric, adipic, pimelic, suberic, azelaic, sebacic, maleic, fumaric, citraconic, mesaconic, itaconic and its homologues (e. g., alpha methyl itaconic, alpha ethyl itaconic, alpha alpha dimethyl itaconic, etc.), acetylene dicarboxylic, benzoic, toluic, phenyl acetic, phthalic, terephthalic, benzoyl phthalic, benzophenone-2,4' dicarboxylic, cinnamic, etc.; the saturated alcohol esters, e. g., the methyl, ethyl, propyl, butyl, isobutyl, ethylene glycol, glycerol, etc., esters of the unsaturated aliphatic monobasic and polybasic acids, illustrative examples of which appear above; vinyl cyclic compounds, e. g. styrene, vinyl naphthalene, vinyl cyclohexane, methylene-tetrahydronaphthalene, vinyl furane, divinyl benzene, etc.; unsaturated ethers, e. g., ethyl vinyl ether, diallyl ether, allyl ethyl ether, divinyl ether, vinyl allyl ether, methallyl propyl ether, etc.; unsaturated ketones, e. g., methyl vinyl ketone, methyl methvinyl ketone, ethyl methvinyl ketone, divinyl ketone, methyl allyl ketone, etc.; methylene malonic esters; 2-chlorobutadiene; etc. Preferred organic compounds which are used in carrying the present invention into effect are compounds having at least one $CH_2$=C< grouping, e. g., acrylic esters such as ethyl acrylate, alkacrylic esters such as ethyl methacrylate, etc. For certain applications, as for instance in the production of so-called "solventless varnishes," I prefer to co-polymerize the modified unsaturated alkyd resin with a monohydric alcohol ester of an alpha unsaturated alpha beta polycarboxylic acid, e. g., diethyl itaconate, diallyl maleate, diallyl itaconate, etc.

To achieve copolymerization of the modified unsaturated alkyd resin with the monomeric or partially polymerized organic compound containing a —CH=C< grouping, a solution of the said resin in the said organic compound first preferably is effected. The organic compound employed advantageously may act as a carrier for a small amount of a polymerization catalyst. Examples of polymerization catalysts which may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, various per-compounds such as perborates, persulfates, perchlorates, etc., aluminum salts such as the halides, e. g., aluminum chloride, organic and inorganic acids such as methacrylic, hydrofluoric, etc., metal compounds of the unsaturated acids as, for instance, cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the components is of secondary importance, copolymerization may be effected merely under the influence of heat, light, or heat and light and in the absence of an accelerator of polymerization. The rate of copolymerization and the properties of the final product vary with the time, temperature and, if a catalyst is used, also with the catalyst concentration. Copolymerization may be effected at from room temperature (20° to 30° C.) to temperatures above 100° C., for example about 130° C., but ordinarily I use temperatures within the range of 60° to 120° C. in causing the mixed components to interpolymerize.

In order that those skilled in the art better may understand how the present invention may be carried into effect, the following examples are given by way of illustration. All parts are by weight. Reference is first made to the components, and proportions thereof, used in the preparation of the modified unsaturated alkyd resins. These resins (identified by letter designations) were copolymerized with —CH=C< compounds in varying amounts, using 1% by weight of the mixed components of benzoyl peroxide as an accelerator of polymerization. A brief description of the properties of the copolymer after 24 hours' interpolymerization at 70° C. is given.

Modified unsaturated alkyd resins

| Resin | Composition |
|---|---|
| A | Ethylene glycol (66 parts), itaconic acid (130 parts) and acetic anhydride (12 parts). |
| B | Diethylene glycol (19.6 parts), itaconic acid (26 parts) and stearic acid (2.25 parts). |
| C | Glycerine (12.2 parts), itaconic acid (19.5 parts) and linseed oil acids (14.2 parts). |
| D | Glycerine (65 parts), itaconic acid (16.5 parts) and linseed oil fatty acids (140 parts). |
| E | Glycerine (12.2 parts), itaconic acid (11.2 parts), phthalic anhydride (5.4 parts) and soya bean acids (13.9 parts). |
| F | Ethylene glycol (6 parts), itaconic acid (14.3 parts) and octadecyl alcohol (5.4 parts). |
| G | Ethylene glycol (10.6 parts), itaconic acid (14.4 parts) and decyl alcohol (3.7 parts). |
| H | Ethylene glycol (15 parts), itaconic acid (31 parts) and tung oil acids (65 parts). |
| I | Diethylene glycol (31.8 parts), maleic anhydride (27.9 parts) and tung oil acids (7.6 parts). |
| J | Ethylene glycol (12 parts), maleic anhydride (11.76 parts), phthalic anhydride (8.9 parts) and linseed oil acids (10.1 parts). |
| K | Ethylene glycol (17.4 parts), maleic anhydride (28.8 parts) and stearic acid (3.4 parts). |
| L | Diethylene glycol (20.4 parts), maleic anhydride (16.6 parts) and soya bean acids (15.2 parts). |
| M | Diethylene glycol (30.6 parts), maleic anhydride (27.93 parts) and decyl alcohol (4.7 parts). |
| N | Ethylene glycol (18 parts), maleic anhydride (29.4 parts), octyl alcohol (2.6 parts) and stearic acid (5.16 parts). |
| O | Ethylene glycol (17.7 parts), maleic anhydride (26.46 parts) and acetic anhydride (7.08 parts). |
| P | Diethylene glycol (35.4 parts), maleic anhydride (27.95 parts) and linseed oil acids (7.7 parts). |
| Q | Ethylene glycol (18 parts), maleic anhydride (27.93 parts) and octyl alcohol (3.9 parts). |
| R | Ethylene glycol (35.4 parts), maleic anhydride (29.4 parts), octyl alcohol (13 parts) and acetic anhydride (11.8 parts). |

Copolymers of modified unsaturated alkyd resins with —CH=C< compounds

| Resin | Parts | —CH=C< compound | Parts | Characteristics of copolymer after 24 hours at 70° C. |
|---|---|---|---|---|
| A | 90 | Diallyl oxalate | 10 | Clear, tough, insoluble and infusable. |
| B | 90 | Diethyl itaconate | 10 | Hard, clear, gel-like. |
| C | 90 | Diethyl itaconate | 10 | Very firm, gel-like, translucent. |
| D | 90 | Diethyl itaconate | 10 | Clear, very viscous. |
| H | 90 | Diethyl itaconate | 10 | Very firm, gel-like. |
| A | 10 | Diallyl itaconate | 90 | Hard, clear. |
| B | 90 | Diallyl itaconate | 10 | Hard, clear, gel-like. |
| B | 90 | Diallyl itaconate methyl methacrylate. | 5 | Hard, clear. |
| C | 90 | Diallyl itaconate | 10 | Firm, translucent, gel-like. |
| D | 90 | Diallyl itaconate | 10 | Very viscous. |
| E | 90 | Diallyl itaconate | 10 | Soft, clear, elastic, gel-like. |
| F | 90 | Diallyl itaconate | 10 | Hard, clear. |
| G | 90 | Diallyl itaconate | 10 | Hard, clear. |
| H | 90 | Diallyl itaconate | 10 | Soft, clear, gel-like. |
| H | 90 | Diallyl itaconate vinyl acetate. | 5 | Firm, clear, gel-like. |
| A | 90 | Methallyl methacrylate. | 10 | Hard, clear. |
| A | 90 | Glycol dimethacrylate. | 10 | Hard, clear. |
| B | 90 | Glycol dimethacrylate. | 10 | Hard, clear. |
| C | 90 | Glycol dimethacrylate. | 10 | Hard, translucent. |
| D | 90 | Glycol dimethacrylate. | 10 | Firm, translucent gel. |
| E | 90 | Glycol dimethacrylate. | 10 | Hard, clear. |
| F | 90 | Glycol dimethacrylate. | 10 | Hard, clear. |
| F | 90 | Methallyl methacrylate. | 10 | Hard, clear. |
| H | 90 | Glycol dimethacrylate. | 10 | Very firm, gel-like. |
| A | 10 | Diallyl oxalate | 90 | Soft, translucent. |
| B | 90 | Diallyl oxalate | 10 | Hard, clear. |
| C | 90 | Diallyl oxalate | 10 | Firm, translucent gel-like. |
| D | 90 | Diallyl oxalate | 10 | Very viscous, clear. |
| E | 90 | Diallyl phthalate | 10 | Very viscous, clear. |
| E | 90 | Diallyl succinate | 10 | Very viscous, clear. |
| F | 90 | Diallyl oxalate | 10 | Very firm, gel-like. |
| G | 90 | Diallyl oxalate | 10 | Gel-like, firm, clear. |
| H | 90 | Diallyl oxalate | 10 | Firm, clear, rubbery. |
| A | 90 | Diallyl maleate | 10 | Hard, clear. |
| A | 10 | Diallyl maleate | 90 | Hard, clear. |
| E | 90 | Diallyl maleate | 10 | Soft, clear, elastic, gel-like. |
| F | 90 | Diallyl maleate | 10 | Hard, clear. |
| G | 90 | Diallyl maleate | 10 | Firm, clear. |
| I | 90 | Diallyl itaconate | 10 | Firm, clear, gel-like. |
| I | 90 | Diethyl itaconate | 10 | Soft, clear, gel-like. |
| J | 90 | Diethyl itaconate | 10 | Very soft, clear, gel-like. |
| J | 90 | Diallyl itaconate | 10 | Very soft, clear, gel-like. |
| K | 90 | Diallyl itaconate | 10 | Hard, clear. |
| K | 90 | Diethyl itaconate | 10 | Hard, clear. |
| L | 90 | Diallyl itaconate | 10 | Firm, translucent gel-like. |
| L | 90 | Diethyl itaconate | 10 | Soft, translucent gel-like. |
| M | 80 | Diallyl itaconate | 20 | Hard, clear, resilient. |
| M | 80 | Diethyl itaconate | 20 | Soft, clear, resilient. |
| N | 90 | Diallyl itaconate | 10 | Hard, clear. |
| N | 90 | Diethyl itaconate | 10 | Slightly soft, clear. |
| O | 90 | Diallyl itaconate | 10 | Hard, translucent. |
| O | 90 | Diethyl itaconate | 10 | Soft, translucent rubbery. |
| P | 90 | Diethyl itaconate | 10 | Soft, clear, gel-like. |
| P | 90 | Diallyl itaconate | 10 | Soft, clear, gel-like. |
| Q | 90 | Diallyl itaconate | 10 | Very firm, slightly translucent. |
| Q | 90 | Diethyl itaconate | 10 | Soft, clear, gel-like. |
| R | 90 | Diethyl itaconate | 10 | Clear, viscous. |
| R | 90 | Diallyl itaconate | 10 | Very firm, clear, gel-like. |
| I | 90 | Diallyl maleate | 10 | Firm, clear, gel-like. |
| J | 90 | Diallyl maleate | 10 | Clear, gel-like, soft. |
| K | 90 | Diallyl maleate | 10 | Firm, clear. |
| L | 90 | Diallyl maleate | 10 | Firm, translucent gel-like. |
| M | 80 | Diallyl maleate | 20 | Firm, clear, resilient. |
| N | 90 | Diallyl maleate | 10 | Slightly soft, clear. |
| O | 90 | Diallyl maleate | 10 | Hard, translucent. |
| P | 90 | Diallyl maleate | 10 | Soft, clear, gel-like. |
| Q | 90 | Diallyl maleate | 10 | Very firm, clear, gel-like. |
| R | 90 | Diallyl maleate | 10 | Firm, clear, gel-like. |
| I | 90 | Ethyl acrylate | 10 | Firm, clear, gel-like. |
| I | 90 | Vinyl acetate | 10 | Firm, clear, gel-like. |
| I | 90 | Methyl methacrylate | 10 | Firm, clear, gel-like. |
| I | 90 | Styrene | 10 | Firm, clear, gel-like. |
| J | 90 | Ethyl acrylate | 10 | Firm, clear, gel-like. |
| J | 90 | Methyl methacrylate | 10 | Firm, clear, gel-like. |
| J | 90 | Vinyl acetate | 10 | Firm, clear, gel-like. |
| J | 90 | Styrene | 10 | Firm, clear, gel-like. |
| K | 90 | Ethyl acrylate | 10 | Hard, clear. |
| K | 90 | Methyl methacrylate | 10 | Hard, clear. |
| K | 90 | Vinyl acetate | 10 | Hard, clear. |
| K | 90 | Styrene | 10 | Hard, clear. |
| L | 90 | Ethyl acrylate | 10 | Firm, translucent gel-like. |
| L | 90 | Methyl methacrylate | 10 | Firm, translucent gel-like. |
| L | 90 | Vinyl acetate | 10 | Firm, translucent gel-like. |
| L | 90 | Styrene | 10 | Firm, translucent gel-like. |
| M | 80 | Vinyl acetate | 20 | Hard, clear. |
| M | 80 | Methyl methacrylate | 20 | Hard, clear. |

*Copolymers of modified unsaturated alkyd resins with —CH=C< compounds—Continued*

| Resin | Parts | —CH=C<compound | Parts | Characteristics of copolymer after 24 hours at 70° C. |
|---|---|---|---|---|
| M | 80 | Ethyl acrylate | 20 | Hard, quite resilient. |
| M | 80 | Styrene | 20 | Hard, quite resilient. |
| N | 90 | Methyl methacrylate | 10 | Hard, clear. |
| N | 90 | Vinyl acetate | 10 | Soft, clear. |
| N | 90 | Styrene | 10 | Soft, clear. |
| N | 90 | Ethyl acrylate | 10 | Soft, cloudy. |
| O | 90 | Methyl methacrylate | 10 | Hard, translucent. |
| O | 90 | Ethyl acrylate | 10 | Hard, translucent. |
| O | 90 | Vinyl acetate | 10 | Hard, clear. |
| O | 90 | Styrene | 10 | Translucent, rubbery. |
| P | 90 | Ethyl acrylate | 10 | Firm, clear, gel-like. |
| P | 90 | Methyl methacrylate | 10 | Firm, clear, gel-like. |
| P | 90 | Vinyl acetate | 10 | Firm, clear, gel-like. |
| P | 90 | Styrene | 10 | Firm, clear, gel-like. |
| Q | 90 | Ethyl acrylate | 10 | Firm, clear, gel-like. |
| Q | 90 | Vinyl acetate | 10 | Firm, clear, gel-like. |
| Q | 90 | Methyl methacrylate | 10 | Hard. |
| Q | 90 | Styrene | 10 | Hard. |
| R | 90 | Ethyl acrylate | 10 | Firm, clear, gel-like. |
| R | 90 | Methyl methacrylate | 10 | Firm, clear, gel-like. |
| R | 90 | Vinyl acetate | 10 | Soft, clear, gel-like. |
| R | 90 | Styrene | 10 | Soft, clear, gel-like. |
| I | 90 | Methallyl methacrylate | 10 | Firm, clear, gel-like. |
| I | 90 | Glycol dimethacrylate | 10 | Firm, translucent gel-like. |
| J | 90 | Methallyl methacrylate | 10 | Firm, clear, gel-like. |
| J | 90 | Glycol dimethacrylate | 10 | Firm, clear, gel-like. |
| K | 90 | Methallyl methacrylate | 10 | Hard, clear. |
| K | 90 | Glycol dimethacrylate | 10 | Hard, clear. |
| L | 90 | Methallyl methacrylate | 10 | Firm, translucent gel-like. |
| L | 90 | Glycol dimethacrylate | 10 | Firm, translucent gel-like. |
| M | 80 | Methallyl methacrylate | 20 | Somewhat turbid, slightly resilient. |
| M | 80 | Glycol dimethacrylate | 20 | Somewhat turbid, slightly resilient. |
| N | 90 | Glycol dimethacrylate | 10 | Hard, slightly translucent. |
| N | 90 | Methallyl methacrylate | 10 | Slightly soft, clear. |
| O | 90 | Methallyl methacrylate | 10 | Slightly soft translucent. |
| O | 90 | Glycol dimethacrylate | 10 | Hard, translucent. |
| P | 90 | Glycol dimethacrylate | 10 | Firm, gel-like translucent. |
| P | 90 | Methallyl methacrylate | 10 | Firm, gel-like translucent. |
| Q | 90 | Methallyl methacrylate | 10 | Very firm, translucent. |
| Q | 90 | Glycol dimethacrylate | 10 | Very firm, translucent. |
| R | 90 | Methallyl methacrylate | 10 | Rubbery, gel-like translucent. |
| R | 90 | Glycol dimethacrylate | 10 | Soft, opaque, gel-like. |
| I | 90 | Diallyl oxalate | 10 | Very soft, clear gel-like. |
| I | 90 | Diallyl succinate | 10 | Very soft, clear gel-like. |
| J | 90 | Diallyl oxalate | 10 | Firm, clear, gel-like. |
| J | 90 | Diallyl succinate | 10 | Soft, clear, gel-like. |
| K | 90 | Diallyl oxalate | 10 | Firm, clear. |
| K | 90 | Diallyl succinate | 10 | Firm, clear. |
| L | 90 | Diallyl oxalate | 10 | Firm, translucent gel-like. |
| L | 90 | Diallyl succinate | 10 | Firm, translucent gel-like. |
| M | 80 | Diallyl oxalate | 20 | Firm, resilient, clear. |
| M | 80 | Diallyl succinate | 20 | Hard, clear. |
| N | 90 | Diallyl oxalate | 10 | Slightly soft, clear. |
| N | 90 | Diallyl succinate | 10 | Slightly soft, clear. |
| O | 90 | Diallyl oxalate | 10 | Translucent, fairly hard. |
| O | 90 | Diallyl succinate | 10 | Translucent, hard. |
| P | 90 | Diallyl oxalate | 10 | Soft, clear, gel-like. |
| P | 90 | Diallyl succinate | 10 | Soft, clear, gel-like. |
| Q | 90 | Diallyl oxalate | 10 | Hard, clear. |
| Q | 90 | Diallyl succinate | 10 | Hard, clear. |
| R | 90 | Diallyl oxalate | 10 | Firm, clear, gel-like. |
| R | 90 | Diallyl succinate | 10 | Firm, clear, gel-like. |

It will be understood, of course, that my invention is not limited to the production of copolymers of the particular modified unsaturated alkyd resins with the particular —CH=C< organic compounds set forth in the above examples and that modified unsaturated alkyd resins and —CH=C< compounds other than those above given by way of illustration may be employed in producing the new interpolymerization products of this invention. Also, polymerization catalysts other than benzoyl peroxide may be employed, for instance accelerators of polymerization such as hereinbefore mentioned.

In certain cases, instead of copolymerizing a single —CH=C< compound with a single modified unsaturated alkyd resin, I may copolymerize a plurality of the said compounds with a single modified unsaturated alkyd resin or with a plurality of such resins. In this way it is possible to obtain a composition comprising a mixture of interpolymers best adapted to meet a particular service application.

Although in the foregoing examples I have shown the production of interpolymers by copolymerizing from, by weight, 10 to 90 per cent of modified unsaturated alkyd resin with from 90 to 10 per cent of a —CH=C< compound, it will be understood, of course, that the invention is not limited to these particular proportions of components. The incorporation of a small amount, e. g., 3 or 4 per cent, of certain —CH=C< compounds, for example diallyl itaconate and other unsaturated monohydric alcohol esters of alpha unsaturated alpha beta polycarboxylic acids, into a modified unsaturated alkyd resin has a beneficial effect upon such alkyd resins, yielding products of improved properties as compared with a modified unsaturated alkyd resin which has been polymerized in the absence of such a —CH=C< compound. However, somewhat better results usually are obtained when the —CH=C< compound constitutes, say, 6 or 8 per cent by weight of the mixed starting components. In most cases the mixed components are so proportioned that the —CH=C< compound constitutes from 10 to 90 per cent by weight of the whole, but the use of higher amounts is not precluded. Thus, in the production of organic plastic masses or coating compositions for certain particular applications, the —CH=C< compound may constitute, say, 96 or 97%, or more, by weight of the whole, depending, for example, upon the particular starting components employed and the particular properties desired in the copolymer.

The interpolymerization products of this invention have a wide range of properties. Depending, for example, upon the particular modified unsaturated alkyd resin and the particular —CH=C< compound employed, the particular proportions thereof, the conditions of polymerization (temperature, time, pressure, presence or absence of catalyst, kind of catalyst used, if any, as well as the catalyst concentration, etc.) and the extent of the interpolymerization, they vary from soft, flexible, soluble bodies to hard, rigid masses of varying resistance to solvents. In intermediate stages of copolymerization some form fluid compositions of varying intrinsic viscosities and may be so used. For coating or impregnating applications where the presence of a small amount of solvent in the cured composition is not objectionable, the mixed polymerizable materials may be diluted with volatile or non-volatile solvents to viscosities best adapted to meet the particular service application, and then may be copolymerized after application of the solution to the particular article to be coated or impregnated. By suitable selection of the starting materials and the conditions of interpolymerization, interpolymers can be obtained in an insoluble, infusible state practically resistant to the destructive effect of other chemical bodies such as acids, bases, solvents and the like.

These new compositions may be used alone or with fillers, dyes, pigments, opacifiers, lubricants, plasticizers, or other modifying agents in, for example, casting, molding and laminating applications, as adhesives, impregnants and surface coating materials. In coating, impregnating and similar applications the mixed components, without added solvent, may be applied to the object to be treated and polymerized as hereinbefore described, with or without the application of pressure, to form the copolymer in situ. They may be used as impregnants for many porous bodies, such as cork, pottery, felts, or fabricated bodies with interstices, such as the windings of electrical coils, netted fibers, interwoven fibrous materials, etc. They also may be used for protectively coating impervious articles such as metals, e. g., iron or copper wire, or for coating or coating and impregnating articles such as paper, wood, cloth, glass fibers in felted, woven or other form, concrete, linoleum, synthetic boards, etc. They also may be employed in the production of wire enamels and winding tapes. The mixed components or partial interpolymers thereof, with or without modifying agents, may be cast and molded under heat or under heat and pressure. They also may be molded by injection, extrusion or compression molding technique whereby they are heat- and pressure-hardened to yield numerous molded articles of manufacture for industrial, household and novelty uses.

What I claim as new and desire to secure by Letters Patent of the United is:

1. A synthetic, polymerized material consisting of the product of polymerization of a mixture of copolymerizable materials consisting of a polymerizable monohydric alcohol polyester of an alpha unsaturated alpha beta polycarboxylic acid and a polymerizable esterification product of a monohydric alcohol, a polyhydric alcohol and a plurality of polycarboxylic acids at least one of which is an alpha unsaturated alpha beta polycarboxylic acid.

2. A synthetic, polymerized material consisting of the product of polymerization of a mixture of copolymerizable materials consisting of a polymerizable monohydric alcohol polyester of an alpha unsaturated alpha beta polycarboxylic acid and a polymerizable esterification product of a monohydric alcohol, a polyhydric alcohol and an alpha unsaturated alpha beta polycarboxylic acid.

3. A synthetic, polymerized composition consisting of an interpolymer obtained by polymerization of a mixture of copolymerizable materials consisting of a polymerizable monohydric alcohol polyester of an alpha unsaturated alpha beta polycarboxylic acid and a polymerizable esterification product of a monohydric alcohol, a polyhydric alcohol, a monocarboxylic acid and an alpha unsaturated alpha beta polycarboxylic acid.

4. A synthetic, resinous composition consisting of the product of polymerization of a mixture of copolymerizable materials consisting of, by weight, from 10 to 90 per cent of a polyallyl ester of an alpha unsaturated alpha beta polycarboxylic acid and from 90 to 10 per cent of a polymerizable esterification product of a polyhydric alcohol, a monohydric alcohol and an alpha unsaturated alpha beta polycarboxylic acid.

5. A synthetic, resinous composition obtained by polymerization of a mixture of copolymerizable materials consisting of, by weight, about 10 per cent of a polyallyl ester of an alpha unsaturated alpha beta polycarboxylic acid and about 90 per cent of a polymerizable esterification product of a monohydric alcohol, a polyhydric alcohol and an alpha unsaturated alpha beta polycarboxylic acid.

6. As a new product, a synthetic resin consisting of an interpolymer of diallyl maleate and a polymerizable esterification product of a monohydric alcohol, a polyhydric alcohol and an alpha unsaturated alpha beta polycarboxylic acid.

7. A hard, clear synthetic resin obtained by polymerization of a mixture composed of, by weight, about 10 per cent of diallyl maleate and about 90 per cent of a polymerizable esterification product of ethylene glycol, itaconic acid and acetic anhydride.

8. A hard, clear synthetic resin obtained by polymerization of a mixture composed of, by weight, about 10 per cent of diallyl maleate and about 90 per cent of a polymerizable esterification product of ethylene glycol, itaconic acid and octadecyl alcohol.

9. A composition comprising the product of polymerization of a polymerizable mixture including (1) a polymerizable unsaturated alkyd resin obtained by reaction of ingredients comprising a polyhydric alcohol, a monocarboxylic acid and itaconic acid and (2) a polyallyl ester of an alpha unsaturated alpha beta polycarboxylic acid, said ester being compatible with the resin of (1).

10. A composition comprising the product of polymerization of a polymerizable mixture including (1) a polymerizable unsaturated alkyd resin obtained by reaction of ingredients comprising a monohydric alcohol, a polyhydric alcohol and an alpha unsaturated alpha beta polycarboxylic acid and (2) a polyallyl ester of an alpha unsaturated alpha beta polycarboxylic acid, said ester being compatible with the resin of (1).

11. A composition comprising the product of polymerization of a polymerizable mixture including (1) a polymerizable unsaturated alkyd resin obtained by reaction of ingredients comprising a monohydric alcohol, a polyhydric alcohol and itaconic acid and (2) a polyallyl ester of an alpha unsaturated alpha beta polycarboxylic acid, said ester being compatible with the resin of (1).

12. A composition comprising the product of polymerization of a polymerizable mixture including (1) diallyl itaconate and (2) a polymerizable unsaturated alkyd resin obtained by reaction of ingredients comprising a monohydric alcohol, a polyhydric alcohol and an alpha unsaturated alpha beta polycarboxylic acid, said resin being compatible with the diallyl itaconate of (1).

13. A composition comprising the product of polymerization of a polymerizable mixture including (1) a polymerizable unsaturated alkyd resin obtained by reaction of ingredients comprising a monohydric alcohol, a polyhydric alcohol and a plurality of polycarboxylic acids at least one of which is an alpha unsaturated alpha beta polycarboxylic acid and (2) a polymerizable monohydric alcohol polyester of an alpha unsaturated alpha beta polycarboxylic acid, said ester being compatible with the resin of (1).

14. A composition as in claim 13 wherein the polyester of (2) is a polyallyl ester of an alpha unsaturated alpha beta polycarboxylic acid.

GAETANO F. D'ALELIO.

Certificate of Correction

Patent No. 2,407,479.                                                                 September 10, 1946.

GAETANO F. D'ALELIO

It is hereby certified that errors appear in the printed specification of the above numbered patent requiring correction as follows: Column 5, line 73, in the table, fourth column thereof, following "methyl methacrylate" insert *5*; column 6, line 13, same table, third column thereof, for "viny acetate" read *vinyl acetate*; same line, fourth column, under "Parts" insert *5*; line 32, same table, third column thereof, for "Dially" read *Diallyl*; same table, line 63, fifth column thereof, for "gel-lkie" read *gel-like*; and that the said Letters Patent should be read with these corrections therein that the same may conform to the record of the case in the Patent Office.

Signed and sealed this 13th day of May, A. D. 1947.

[SEAL]

LESLIE FRAZER,
*First Assistant Commissioner of Patents.*